May 29, 1951 G. L. LAURENT 2,555,198

CHRONOMETRIC RECORDING DEVICE

Filed July 12, 1946 3 Sheets-Sheet 1

Inventor
GEORGES LOUIS LAURENT
By [signature]
his ATTY.

CHRONOMETRIC RECORDING DEVICE

Filed July 12, 1946 3 Sheets-Sheet 2

Inventor:
GEORGES LOUIS LAURENT
By Richardson, David and Nordon
Att'ys

May 29, 1951 G. L. LAURENT 2,555,198

CHRONOMETRIC RECORDING DEVICE

Filed July 12, 1946 3 Sheets-Sheet 3

Inventor:
GEORGES LOUIS LAURENT
By Richardson, David and Gordon
Att'ys

Patented May 29, 1951

2,555,198

UNITED STATES PATENT OFFICE 2,555,198

CHRONOMETRIC RECORDING DEVICE

Georges Louis Laurent, Chalon-sur-Saone, France

Application July 12, 1946, Serial No. 683,062
In France October 4, 1945

11 Claims. (Cl. 346—94)

My invention has for its object improvements in time recording apparatus adapted to record chronologically and uninterruptedly a succession of times on a strip of paper that is shifted after each recording and cooperates with discs, the peripheries of which carry numerals, each printing operation being provided through the depression of a push button adapted to control through the agency of a pawl the displacement of one of two sliding gears for ensuring control thereof by a continuously rotating shaft, said gear operating preferably through a camshaft to rock the numbered discs into contact with the record strip for recording in succession thereon the times measured, to disengage the second gear connecting them with the rotary shaft, to return them to zero and to ensure the re-engagement of the other sliding gear with the rotary shaft for starting the next recording operation.

The apparatus prints in known figures on a strip or sheet of paper the measured times elapsed between two successive depressions of the push button. The successive depressions exerted on said push button are executed each time as desired by the operator and the times corresponding to the intervals elapsed between two successive depressions are printed by the apparatus in true values without it being necessary to calculate them through subtraction.

The apparatus disclosed requires neither reading nor transfer nor subsequent calculation and leaves the operator free during the whole time of operation.

Said apparatus cannot lead to any error in reading as it requires no actual reading. The times generally measured in hundredths of a minute are printed on a strip of paper underneath one another. Very short times of the order of one hundredth of a minute may be recorded while the operator may devote all his time to the visual observation of the operation to be studied. The strip of paper on which the times are printed is provided with a sufficient breadth and arranged so that the operator may record all useful indications in front of each measured time.

Appended diagrammatic drawings illustrate by way of example a form of execution of my invention.

Figures 1, 2, 3:
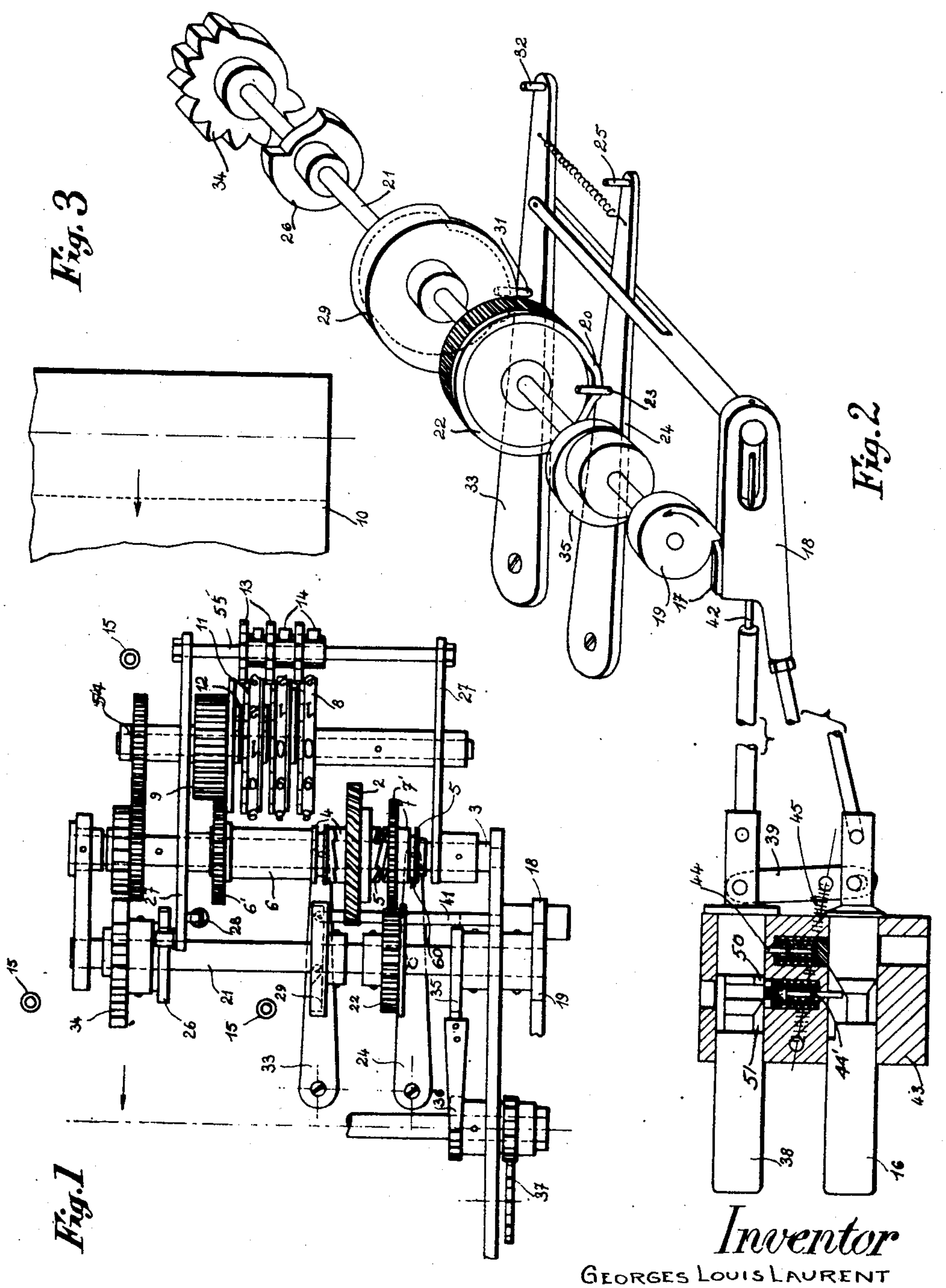
Fig. 1 is a diagrammatic plan view of the mechanism after removal of the protecting casing end of the supporting plate.
Fig. 2 is a perspective view of the camshaft and auxiliaries.
Fig. 3 illustrates a fragmentary record strip used in the apparatus including said mechanism.
Figures 4, 5, 6:
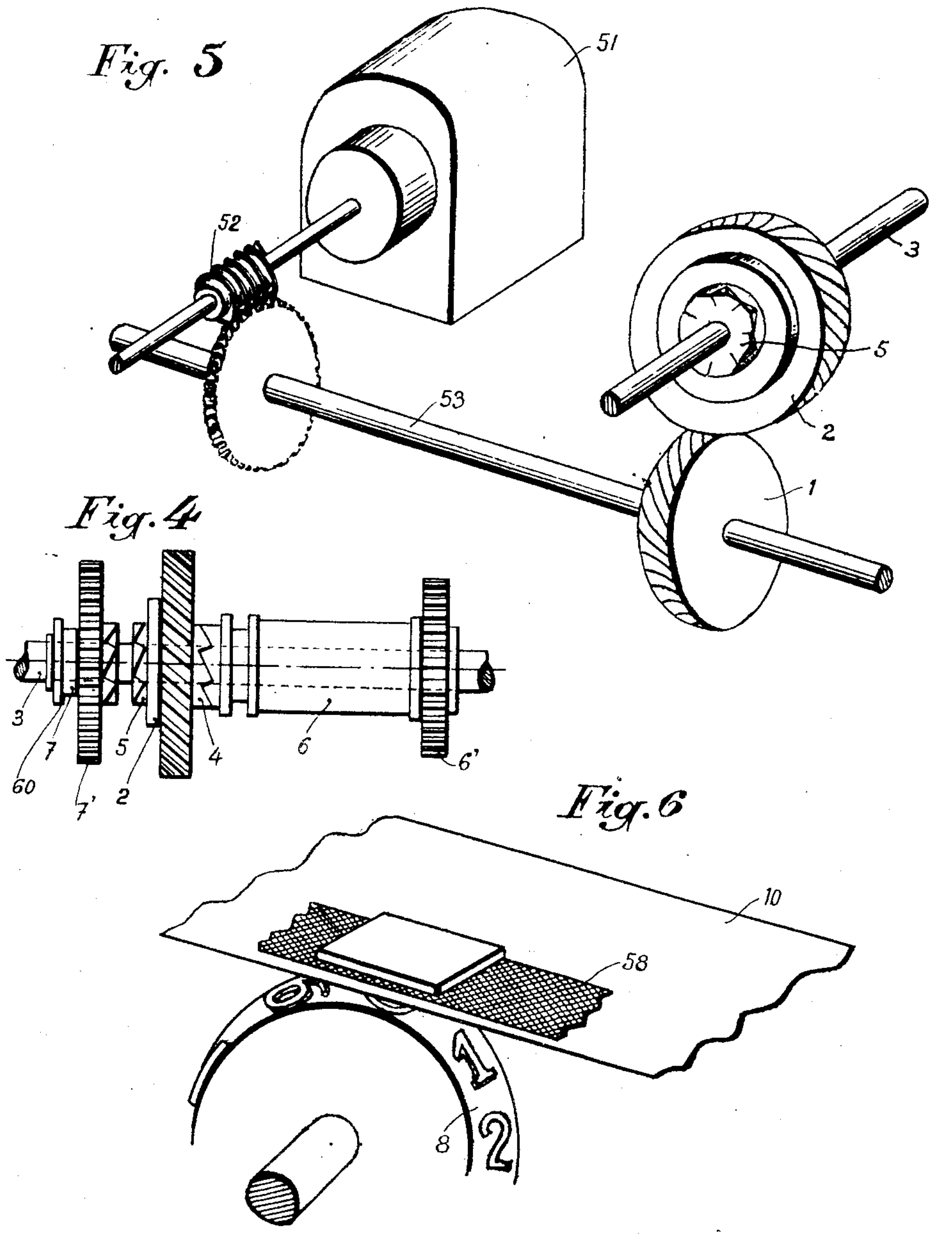
Fig. 4 is a detail view of a clutch forming part of said mechanism.
Fig. 5 illustrates the driving means therefor.
Fig. 6 is a diagrammatic showing of the printing means.

As illustrated more particularly in Fig. 5, the driving means for the apparatus include a motor 51 controlling through a reducing gear 52 an intermediary shaft 53 to make same rotate at about 100 R. P. M. Said shaft 53 controls a wheel 1 driving a pinion 2 carried by the main shaft 3, on which it can rotate, while being secured against axial displacement. The two pinions 1 and 2 having the same number of teeth, have a transmission ratio 1:1. The loose pinion 2 carries on either side thereof dogs 4—5. The latter, as apparent from the general view of the mechanism, appearing in Fig. 1, are adapted to engage corresponding dogs on the two sliding gears 6 and 7 respectively, that are carried by the main shaft 3. The arrangement of these dogs is shown in detail in Fig. 4, wherein the pinion 2 engages through its dogs 4 the sliding gear 6, while the sliding gear 7 is shown in its disengaged position.

Figures 7, 8, 9:
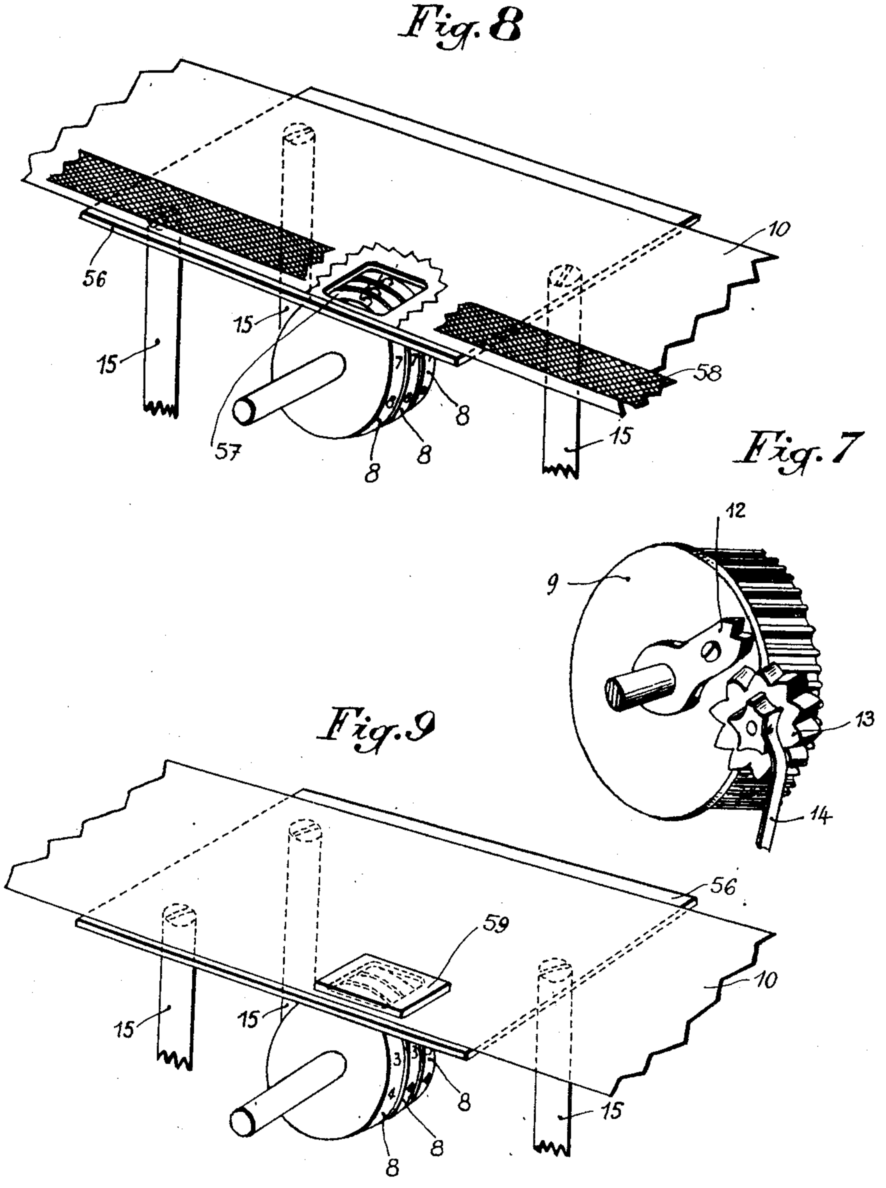
Fig. 7 is a perspective view of a catch system associated with the printing means.
Fig. 8 is a further more general view illustrating the operation of the printing means.
Fig. 9 shows a modification of the arrangement of Fig. 8.

The sliding gear 6 is provided with an enlarged toothed portion 6′ in permanent mesh with a broad pinion 9 keyed to a shaft 54 carrying the printing and metering mechanism. The latter is constituted by a number of superposed engraved printing and metering discs carried loose by last mentioned shaft 54. Each of these discs is rigid through one side with a pinion 11 provided with twenty teeth and through its other side, except for the last disc, with a partly toothed sector 12 provided with two teeth having the same pitch as those on the pinions 11. A similar toothed sector is rigid with the surface of the pinion 9 facing the discs as illustrated in Fig. 7. Each pinion 11 is in permanent mesh with a loose pinion 13 provided with ten teeth and mounted on an auxiliary shaft 55 carried together with the shaft of the printing means in a frame 21 pivotally carried by the main shaft 3; said loose pinions 13 are adapted to engage the sector 11 facing them and each of them is rigid with a hub having five flat faces adapted to engage selectively a flat locking spring 14 for exactly defining the angular position of the pinion 13.

In this respect attention is drawn to Fig. 7 that shows, with further detail, the cooperation between the pinion 9 and the sector 12 rigidly carried thereby with the cooperating loose pinion 13. It should be remarked also that on Fig. 1 the sector 12 on the second disc is shown in an angularly shifted position with reference to the sector on the first disc and on the pinion 9.

At each revolution of the pinion 9, the sector 12 rigid with the latter drives through its two teeth meshing with the first pinion 13 the first pinion 11 rigid with the first engraved disc 8, so that the latter advances through $\frac{1}{10}$ of a revolution by reason of the transmission ratio thus provided, which means said first engraved disc moves then through one division. When said first engraved disc has executed a complete revolution, it drives similarly through its sector 12 and associated loose pinion 13, the second engraved disc 8 through $\frac{1}{10}$ of a revolution and so on as well known in metering mechanisms. Three or more discs 8 may be provided.

A paper strip 10 (Fig. 3) slides over a carrier plate 56 secured to the uprights 35 and provided with an opening 57 registering with the location of the engraved metering and printing discs. This strip of paper 10 passes thus between the periphery of the engraved discs and the inking ribbon 58 bearing against a suitable support, as illustrated more particularly in Figs. 6 and 8.

It is also possible to coat the paper through a suitable breadth thereof with a chemical product adapted to cause the figures on the discs to appear through mere pressure exerted by the engraved discs against a support 59 (Fig. 9) in which case the inking ribbon is unnecessary.

The engraved discs 8 carry letters or digits that are directly legible inasmuch as they do form direct reproductions instead of mirror pictures of the items to be printed as usual in a printing device. This is possible by reason of the inking ribbon being located on the opposite side of the paper strip with reference to the printing wheel. An elongated transversal slot not illustrated may be provided in the carrier plate in register with the opening 57 wherethrough the operator may write down any desired information on the strip.

Turning back to the sliding gears, it is apparent that the sliding gear 7 is also rigid with a comparatively large pinion 7' that is in permanent mesh with the toothed cam 22 on the camshaft 21 parallel with the main shaft 3. Said camshaft carries a plurality of cam-shaped parts 19—35—22—29—26—34, the part played by which will be disclosed hereinafter.

A double set of push-buttons 16—38 is adapted to control the operation of the camshaft, the push button 16 being intended for starting a succession of different recording operations corresponding to a succession of uninterrupted phenomena, while the push button 38 is used only for the last of such operations in order to bring the mechanism to a standstill without setting it again in a position for starting a further operation.

The operation is as follows: at the beginning of the sequence of recording operations, the push button 16 is depressed so as to act through the apertured member 18 on a pawl 17, said pawl constraining the cam 19 to rotate through a predetermined fraction of a revolution. This impulse causes therefore the cam 22 to rotate through the same angular distance, whereby said cam 22 acts directly through its projection 20 on a stud 23 rigid with a pivoting lever 24 which latter engages through a further stud 25 at its outer end a groove 60 provided in the sliding gear 7. This causes the latter to be shifted into engagement with the permanently rotating pinion 2 through the dogs 5.

The drive of the camshaft being thus provided through the engagement of the rotating sliding gear 7 with the teeth on the cam 22, the continuation of the revolution of the camshaft causes through the cam 26 a pivoting motion to be given to the frame 27 carrying the printing means. Consequently the engraved printing discs 8 are brought into operative contact with the paper 10 which provides for the printing of the digits or the like items appearing on the discs, after which the frame 27 is automatically returned into its original position by the spring 28.

At the same time as the frame 27 is rocked by the cam 26, the cam 29 acts on the above mentioned pivoting lever 33 through the stud 31 so that the stud 32 carried at the end of said lever 33 and engaging the groove in the sliding gear 6, may shift said sliding gear 6 back out of engagement with the pinion 2 through the dogs 4, so that the printing means are no longer driven into rotation. This latter operation is not provided after the first depression of the knob since the sliding gear has hereto remained inoperative.

The cam 34 is constituted by a gear with a gap in its series of teeth and it is adapted after the frame 27 has returned into its original position to engage through a gearwork appearing at the outer end of the main shaft 3 and of the printing shaft 54 to make the latter shaft rotate through one complete revolution to return the different discs into their starting positions as is obtained through the engagement of a catch rigidly carried by each disc with a longitudinal zero groove provided in said spindle, the pinion 9 being also returned to zero in a similar manner through this rotation of the spindle.

Lastly the cam 35 is adapted to control through a catch 36 cooperating therewith, a ratchet driving the strip of paper and also a knurled wheel 37 driving the inking ribbon, if any such ribbon is used for the printing, so that the paper and ribbon may progress by a predetermined distance at each elementary operation.

The disconnection of the sliding gear 7 is obtained at the end of each elementary operation by the cam 22 that releases the lever 24 after the cam 29 has engaged on the other hand the sliding gear 6 through action on the stud 31 of lever 33 so that the sliding gear 6 provides henceforward for the driving of the printing discs. The disconnection of the sliding gear 7 thus stops the rotation of the camshaft 21 after a rotation through one revolution. From this moment onwards each depression of the push button 16 provides consequently in succession for transient rotation of the camshaft, the printing steps, return of the metering gear to zero and continuation of the metering starting from zero.

When the operator is to record the last time of an uninterrupted series of times, it is necessary, in contradistinction with the preceding sequence of operations, that after the printing of said last time, the engraved discs may remain stationary at zero, in which case the sliding gear 16 should not be allowed to return into its clutched position.

To this purpose, the operator depresses the knob 38 which drives through the agency of the lever 39 the above mentioned knob 16 until the knob 38 is locked by the detent 44 engaging the first groove 51 provided in the knob 38. At this moment, the second groove 50 shown on the left hand side of the knob 38 allows the detent 44' to rise into said second groove so that the lower end of the detent 44' is slightly raised. The recording operation is thus the same as that disclosed hereinabove and the knob 38 at the same time as it acts on knob 16 urges the bolting rod 42 into the slotted spindle 41. The knob 38 is as disclosed in its turn held in position inside the block 43 by the detent 44 and in this position the pawl 17 is urged far ahead of the tooth on cam 19 on which it cannot act therefore any more.

The bolting rod 42 prevents the slotted spindle 41 from returning into its original position after a rotation of the camshaft. Now this slotted spindle 41 is connected with the lever 33 carrying the projection 32. The latter holds thus the sliding gear 6 in its disconnected position and the drive of the engraved discs cannot be resumed at the end of the recording provided by the knob 38.

When the operator wishes to resume operation and to record a further series of times, he depresses the knob 16 that has already been carried along as stated by the operation of the knob 38. As the slope on the knob 16 moves towards the right it allows the lower end of the right hand detent 44 to also engage the groove in the knob 16. The upper end of said detent 44 is lowered under the action of its spring so that the knob 38 returns to its original position under the action of its springs 45. It will be appreciated that the displacement towards the right of the knob 16 has been made possible through the fact that the lower end of the detent 44' is slightly raised through operation of the knob 38 as disclosed.

The locking rod 42 rigid with the knob 38 is thus caused to recede with it and the slotted spindle 41 returns into its original position and the drive of the engaged discs is again allowed. The pawl 17 also returns into its original position and may thus act again on the cam 19 when the operator records the next series of times.

When the operator releases the knob 16, the latter also returns into starting position under the action of a spring, not illustrated, said starting position being that illustrated in the drawing. It will be seen that the successive times forming a succession of consecutive operations are recorded through depression of the knob 16, the lower end of the detent 44' that is not raised any more acting as a stop.

The operator uses thus the knob 16 for starting and for recording the different times except the last. The knob 38 is used only for recording said last time.

The mechanism described, as also the motor, the winding and unwinding means for the strip of paper and of the inking ribbon are secured inside a prallelepipedic casing. Its cover includes a gate through which it is possible to see one line of the strip of paper 10 with the exception of the printed numerals. The operator may thus write down in said space all the desired indications. The edges of the gate are sloping so as to guide the pencil.

The apparatus is thus preferably arranged so that the printed times cannot be read by the operator before the end of the time recording, which is of considerable importance when the operator is to subjectively give out an estimation as to the rate of working of the workmen he is studying.

The apparatus described is portable. In the case of control through an electric motor, a yielding wire allows connection with current terminals.

The documents obtained are very legible and their examination is very rapid.

As apparent, the invention is by no means limited to the single form of execution which has been more particularly described and it covers all the modifications thereof falling within the scope of accompanying claims.

For instance the apparatus may be controlled by means of a single knob which when depressed half-way allows successive recording and when urged completely home provides for the locking of the discs returned to zero at the end of the measuring operation.

The apparatus is not exclusively reserved for industrial purposes but also to all circumstances where it is necessary to record times.

I claim:

1. A time recording device for recording an uninterrupted series of times on a record strip comprising a metering and printing gear including a plurality of interconnected wheels carrying peripherally the characters to be printed and adapted to rotate at different progressively decreasing speeds, a control member, a main shaft, means for controlling the continuous rotation of said shaft, two clutches carried by said main shaft and adapted to provide for the connection and disconnection of the main shaft with the metering gear and the control member respectively, a hand-operable knob adapted to engage the second clutch, means controlled by the control member when operatively connected through the second clutch with the main shaft for producing in succession the shifting of the metering gear into its operative position in cooperation with the record strip, for returning the metering gear into its zero position and further means controlled by the control member for engaging the first clutch and starting the metering gear operating again after its return to zero through engagement with the main shaft.

2. A time recording device for recording an uninterrupted series of times on a record strip comprising a metering and printing gear, a controlling camshaft, a main shaft adapted to rotate continuously, two clutches carried by said main shaft and adapted to provide for connection and disconnection of the main shaft with the metering and printing gear and the camshaft respectively, a hand operable cam adapted to shift the camshaft through a predetermined angle, four cams rigid with the camshaft, a transmission controlled by the first cam when the camshaft has been angularly shifted by the hand operable knob and adapted to engage the second clutch and to hold it engaged through one entire revolution of the camshaft minus said predetermined angle, a transmission controlled by the second cam and adapted to engage the metering and printing gear transiently with the record strip, means whereby the third cam returns the metering gear after its transient engagement with the record strip into its zero position, means whereby the fourth cam controls the engagement of the first clutch when the third cam has acted, and its disengagement at the beginning of the next revolution of the camshaft.

3. A time recording device for recording an uninterrupted series of times on a record strip comprising a metering and printing gear, a controlling camshaft, a main shaft adapted to rotate continuously, two clutches carried by said main shaft and adapted to provide for connection and disconnection of the main shaft with the metering and printing gear and the camshaft respectively, a hand operable cam adapted to shift the camshaft through a predetermined angle, five cams rigid with the camshaft, a transmission controlled by the first cam when the camshaft has been angularly shifted by the hand operable knob and adapted to engage the second clutch and to hold it engaged through one entire revolution of the camshaft minus said predetermined angle, a transmission controlled by the second cam and adapted to engage the metering and printing gear transiently with the record strip, means whereby the third cam returns the metering gear after its transient engagement with the record strip into its zero position, means whereby the fourth cam controls the engagement of the first clutch when the third cam has acted, and its disengagement at the beginning of the next revolution of the cam, means whereby the fifth cam controls once per revolution of the camshaft a shifting of the record strip by one unitary length.

4. A time recording device for recording an uninterrupted series of times on a record strip comprising a metering and printing gear, a controlling camshaft, a main shaft adapted to rotate continuously, two clutches carried by said main shaft and adapted to provide for connection and disconnection of the main shaft with the metering and printing gear and the camshaft respectively, a hand operable cam adapted to shift the camshaft through a predetermined angle, four cams rigid with the camshaft, a transmission controlled by the first cam when the camshaft has been angularly shifted by the hand operable knob and adapted to engage the second clutch and to hold it engaged through one entire revolution of the camshaft minus said predetermined angle, a transmission controlled by the second cam and adapted to engage the metering and printing gear transiently with the record strip, means whereby the third cam returns the metering gear after its transient engagement with the record strip into its zero position, means whereby the fourth cam controls the engagement of the first clutch when the third cam has acted, and its disengagement at the beginning of the next revolution of the camshaft, an auxiliary knob adapted to control the camshaft in the same manner as the first knob and means controlled by said auxiliary knob and adapted to provide for the locking of the metering gear in its disconnected final position.

5. A time recording device for recording an interrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including metering wheels in permanent operative connection with the second sliding gear and a shaft carrying said wheels, a frame revolubly carrying the metering gear shaft and adapted to rotate round the axis of the two sliding gears and to bring said metering gear in and out of its recording position in cooperation with the record strip, a spring urging said frame back into its inoperative starting position, a control knob, means whereby the depression of said control knob produces the operative engagement of the first sliding gear with the rotary member to make the camshaft execute one revolution, a plurality of cams on the camshaft, a transmission through which the first of said cams provides for the temporary rocking of the metering gear frame out of its starting position into recording position, means controlled by the second cam for returning the metering gear wheels to zero, means controlled by the third cam for shifting the record strip by a predetermined amount and means associated with a further cam for reengaging the second sliding gear at the end of one revolution of the camshaft after operation of the two first cams and disengaging it at the beginning of the next before operation of said cams.

6. A time recording device for recording an uninterrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including metering wheels in permanent operative connection with the second sliding gear and a shaft carrying same, a frame revolubly carrying the metering gear shaft and adapted to rotate round the axis of the two sliding gears and to bring said metering gear into and out of its recording position in cooperation with the record strip, a spring urging said frame back into its inoperative starting position, a control knob, the depression of which is adapted to give a first rotary impulse to the camshaft, a cam rigid with the camshaft adapted upon said impulse to provide for the connection of the first sliding gear with the rotary member during an entire revolution of the camshaft less the angle corresponding to said impulse, further cams on the camshaft, a transmission through which the first of said cams provides for the temporary rocking of the metering frame out of its starting position into recording position, means controlled by the second cam for returning the metering gear wheels to zero, means controlled by the third cam for shifting the record strip by a predetermined amount and means associated with a further cam for reengaging the second sliding gear at the end of one revolution of the camshaft after operation of the two first cams and disengaging it at the beginning of the next before operation of said cams.

7. A time recording device for recording an uninterrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including metering wheels in permanent operative connection with the second sliding gear and a shaft carrying said wheels, a frame revolubly carrying the metering gear shaft and adapted to rotate round the axis of the two sliding gears and to bring said metering gear into and out of its recording position in cooperation with the record strip, a spring urging said frame back into its inoperative starting position, a control knob the depression of which is adapted to give a first rotary impulse to the camshaft, a cam rigid with the camshaft adapted upon said impulse to provide for the connection of the first sliding gear with the rotary member during an entire revolution of the camshaft less the angle corresponding to said impulse, further cams on the camshaft, a transmission through which the first of said cams provides for the temporary rocking of the metering frame out of its starting position into recording position, means controlled by the second cam for returning the metering gear wheels to zero, means controlled by the third cam for shifting the record strip by a predetermined amount and means associated with a further cam for reengaging the second sliding gear at the end of one revolution of the camshaft after operation of the two first cams and disengaging it at the beginning of the next before operation of said cams, an auxiliary knob adapted to provide the first impulse of the camshaft and locking means controlled by said auxiliary knob for preventing the reengagement of the second sliding gear after its disconnection has been produced by the corresponding cam.

8. A time recording device for recording an interrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including metering wheels in permanent operative connection with the second sliding gear and a shaft carrying said wheels, a frame revolubly carrying the metering gear shaft and adapted to rotate round the axis of the two sliding gears and to bring said metering gear in and out of its recording position in cooperation with the record strip, a spring urging said frame back into its inoperative starting position, a control knob, means whereby the depression of said control knob produces the operative engagement of the first sliding gear with the rotary member to make the camshaft execute one revolution, a plurality of cams on the camshaft, a transmission through which the first of said cams provides for the temporary rocking of the metering gear frame out of its starting position into recording position, means controlled by the second cam for returning the metering gear wheels to zero, means associated with a further cam for reengaging the second sliding gear at the end of one revolution of the camshaft after operation of the two first cams and disengaging it at the beginning of the next before operation of said cams, a casing enclosing the camshaft, the metering gear and the main shaft and provided with a gate registering with the metering gear wheels in their shifted angular position and means controlled by the third cam once per revolution of the camshaft for shifting the record strip over the metering wheels to obtain on the outer side thereof an impression of the characters appearing along the corresponding generating line of the metering and printing wheels.

9. A time recording device for recording an interrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including metering and printing wheels in permanent operative connection with the second sliding gear and a longitudinally grooved shaft carrying said wheels to allow same to snap into transient angular engagement with the shaft groove at their zero setting, a frame revolubly carrying the metering gear shaft and adapted to rotate round the axis of the two sliding gears and to bring said metering gear into and out of its recording position in cooperation with the record strip, a spring urging said frame back into its inoperative starting position, a control knob, means whereby the depression of said control knob produces the operative engagement of the first sliding gear with the rotary member to make the camshaft execute one revolution, a plurality of cams on the camshaft, a transmission through which the first of said cams provides for the temporary rocking of the metering gear frame out of its starting position into recording position, means controlled by the second cam for returning the metering gear wheels to zero, means controlled by the third cam for shifting the record strip by a predetermined amount and means associated with a further cam for reengaging the second sliding gear at the end of one revolution of the camshaft after operation of the two first cams and disengaging it at the beginning of the next before operation of said cams.

10. A time recording device for recording an uninterrupted series of times on a record strip comprising a driving member adapted to rotate continuously, two coaxial sliding gears adapted to be drivingly engaged by said rotary member, a camshaft in permanent operative connection with the first sliding gear, a time metering and printing gear including wheels in permanent operative connection with the second sliding gear and a shaft carrying said wheels, a frame revolubly carrying the metering gear shaft and adapted to rotate round the axis of the two sliding gears and to bring said metering gear in and out of its recording position in cooperation with the record strip, a spring urging said frame back into its inoperative starting position, a control knob, means whereby the depression of said control knob produces the operative engagement of the first sliding gear with the rotary member to make the camshaft execute one revolution, a plurality of cams on the camshaft, a transmission through which the first of said cams provides for the temporary rocking of the metering gear frame out of its starting position into recording position, means controlled by the second cam for returning the metering gear wheels to zero, means controlled by the third cam for shifting the record strip by a predetermined amount and means associated with a further cam for reengaging the second sliding gear at the end of one revolution of the camshaft after operation of the two first cams and disengaging it at the beginning of the next before operation of said cams, an auxiliary hand operable knob controlling the first knob, a leverage controlled by said auxiliary knob, means whereby said leverage is adapted when the auxiliary knob is actuated to hold the first sliding gear in a disengaged position and further means adapted to be controlled by the first knob after operation of the auxiliary knob and to return said leverage into its inoperative position.

11. A time recording device for recording an uninterrupted series of times on a record strip comprising a metering and printing gear including a plurality of interconnected wheels carrying peripherally the characters to be printed and adapted to rotate at different progressively decreasing speeds, a control member, a main shaft, means for controlling the continuous rotation of the shaft, two clutches carried by said main shaft and adapted to provide for the connection and disconnection of the main shaft with the metering gear and the control member respectively, a hand-operable knob adapted to engage the second clutch, means controlled by the control member when operatively connected through the second clutch with the main shaft for producing in succession the shifting of the metering gear into its operative position in cooperation with the record strip, for returning the metering gear into its zero position and further means controlled by the control member for engaging the first clutch and starting the metering gear operating again after its return to zero through engagement with the main shaft, an auxiliary hand operable knob adapted to engage the second clutch, a leverage controlled by said auxiliary knob, urging and holding the first clutch in a disengaged position and means associated with the two knobs whereby a depression of the first knob after operation of the second knob returns the second knob and associated leverage back into their inoperative position.

GEORGES LOUIS LAURENT.

REFERENCES CITED

The following references are of record in the file of this patent:

UNITED STATES PATENTS

| Number | Name | Date |
|---|---|---|
| 966,553 | Jackson | Aug. 9, 1910 |
| 1,218,795 | Merritt | Mar. 13, 1917 |
| 1,862,946 | Shafer | June 14, 1932 |
| 1,905,288 | Hoffman | Apr. 25, 1933 |
| 1,982,882 | Rhodes | Dec. 4, 1934 |
| 2,153,185 | Harrison | Apr. 4, 1939 |
| 2,153,215 | Torkelson | Apr. 4, 1939 |
| 2,229,696 | Engst | Jan. 28, 1941 |